April 6, 1943.                F. J. WESTROPE                2,316,035
                                  MOLDING
                            Filed Nov. 4, 1940

Inventor
Frederick J. Westrope

Attorneys

Patented Apr. 6, 1943

2,316,035

UNITED STATES PATENT OFFICE 2,316,035

MOLDING

Frederick J. Westrope, Pleasant Ridge, Mich., assignor, by mesne assignments, to F. L. Jacobs Co., a corporation of Michigan Application November 4, 1940, Serial No. 364,206

6 Claims. (Cl. 20—74)

This invention relates to moldings and in particular to composite moldings.

One object of this invention is to provide a composite molding having a metallic base and an insert of ornamental material yieldingly inserted and secured in the base.

Another object is to provide a composite molding having a base with an elongated recess and an elongated insert, preferably of plastic material, inserted and held in the base by its resilient construction and characteristics.

Another object is to provide a molding having a base with an elongated dove-tailed recess and an insert of ornamental material, such as plastic material, snapped into the recess by flexing it transversely, means being optionally provided for enhancing the flexing effect and facilitating the insertion.

In general, the molding of the present invention consists of an elongated base member, preferably of bent metal and having a longitudinal recess formed in the exposed surface thereof. The recess is adapted to receive a longitudinal strip of ornamental material, such as plastic material, which is flexed transversely and snapped into place in the recess. The recess is preferably of dove-tailed form or otherwise having inwardly extending edges to hold the insert in the recess. A modification provides an insert with a longitudinal groove adjacent the center line thereof for enhancing and facilitating the transverse flexing of the insert strip.

Figure 1:
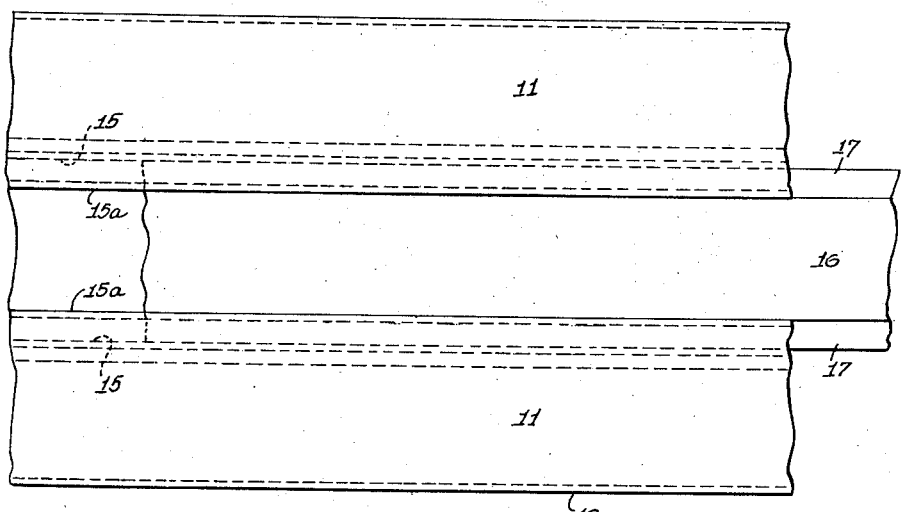
Figure 1 is a front elevation of a composite molding according to a preferred embodiment of the invention, showing the ornamental strip snapped into the recess.
Figure 2:
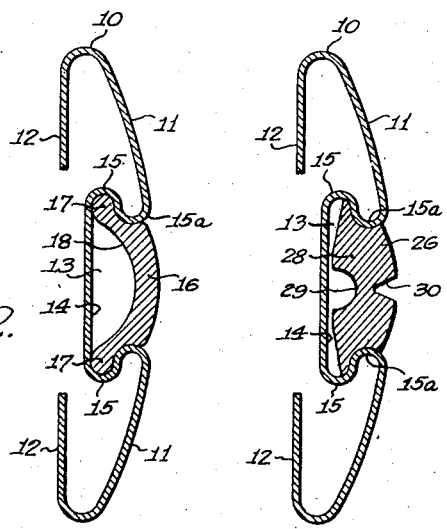
Figure 2 is a cross-section along the line 2—2 in Figure 1.

Referring to the drawing in detail, Figures 1 and 2 show a preferred embodiment of the molding of the present invention as consisting of a base member 10 having outer marginal portions 11 and bent-back supporting edges 12 at the rear thereof. A central recess 13 is formed by bending the central portion 14 into a level beneath the adjacent marginal portions 11. The ends 15 of the recess are extended laterally a greater distance than the outer edges 15a of the recess 13, thereby giving a dovetailed effect.

Disposed within the recess 13 is an insert 16, preferably of ornamental material such as plastic material, and having longitudinal edges 17 extending into the recess ends 15. The inner surface of the insert 16 is preferably made longitudinally concave as at 18, so as to enhance the flexing effect of the insert 16.

To place the insert 16 in the recess 13, the edges 17 thereof are pressed or flexed inwardly toward the center thereof and the strip pushed past the outer edges 15 of the base portion 10. The latter, being preferably of metallic construction, also yield to some extent so that the insert 16 snaps into the recess 13 and its edges 17 firmly engage the undercut edges 15 of the recess 13.

Figure 3:
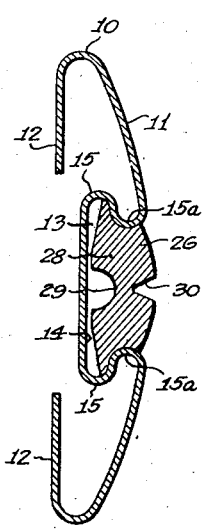
Figure 3 is a cross-section similar to Figure 2 but including a modified insertion.

In the modification shown in Figure 3, the insert 26 is provided with ends 27 and a cutaway bottom wall 28 with a relatively deep central longitudinal groove 29. Optionally included is an outer central longitudinal groove 30.

The projection of the central groove 29, which is relatively narrower than the concave portion 18 of Figure 2, enables a thicker insert 26 to be made, yet this insert is sufficiently flexible to be snapped into place in a similar manner to that of Figure 2. This is accomplished by the thinning of the central longitudinal portion of the strip between the inner groove 29 and the outer surface. This is especially true when the outer groove 30 is provided opposite the inner groove 29.

While a specific embodiment of the invention has been described and illustrated, it will be understood that various modifications may be made within the scope of the appended claims without departing from the spirit of the invention.

What I claim is:

1. In a molding strip, an elongated base member of sheet material bent centrally and inwardly to form a longitudinal recess with overhanging edges and return bent outwardly in opposite direction away from said recess and terminating in inwardly directed free edges to form a supporting portion, and an insert of resilient material sprung into said recess between said overhanging edges whereby said supporting portion will expand into engagement with its support.

2. In a molding strip, an elongated base member having a recess with inwardly extending overhanging edges, and an insert having outwardly extending inner edges sprung into said recess, said insert having a centrally disposed longitudinally extending weakened portion formed by providing a longitudinal groove along the inner surface and a central longitudinal groove disposed along the outer surface of said insert to facilitate the flexing of the insert in springing it into the recess.

3. In a molding strip, an elongated base member of sheet material bent to form a longitudinal recess with inwardly extending boundaries along the longitudinal marginal edges of said strip, and an insert of resilient material sprung into said recess, said insert having a longitudinally disposed groove along the inner surface thereof the bottom surface of said insert on either side of said inner groove being convexly curved whereby a centrally longitudinally extending weakened portion is formed which cooperates with the recess to urge said longitudinal marginal boundaries inwardly and facilitate the flexing of said insert in springing it into the recess.

4. In a molding, an elongated base member of sheet material having its central portion bent inwardly to form a longitudinal dovetail recess with inwardly extending overhanging edges, said base member having its opposite longitudinal marginal free edges on opposite sides of said recess bent back toward each other substantially into the same plane to provide a pair of spaced and relatively flat contacting portions and an insert disposed within said recess having a centrally disposed longitudinally weakened portion in alinement with the overhanging edges of the dovetail recess.

5. In a molding strip, an elongated base member of sheet material having its central portion bent inwardly to form a longitudinal dovetail recess, with inwardly extending overhanging edges and having its outer portions adjacent said recess edges bent outwardly in opposite directions away from said recess, said base member having its opposite marginal free edges on opposite sides of said recess bent back upon themselves toward each other in substantially the same plane below said recess to present relatively smooth flat contacting surfaces to the support upon which said molding strip is secured, and an insert of resilient material having a centrally weakened portion extending throughout its length to permit flexing of said insert when inserted in said molding strip.

6. In a molding strip, an elongated base member of sheet material having its central portion bent inwardly to form a longitudinal recess with continuous bottom and side walls and inwardly extending overhanging edges, said base member having its opposite longitudinal marginal free edges bent back toward each other substantially in the same plane to provide spaced relatively flat smooth contacting portions for engaging a support and an insert of resilient material sprung into said recess.

FREDERICK J. WESTROPE.